United States Patent
Shen et al.

(10) Patent No.: US 10,756,808 B1
(45) Date of Patent: Aug. 25, 2020

(54) METHODS AND SYSTEMS FOR TRANSMITTING TERRESTRIAL AIRCRAFT DATA USING BIOMETRICALLY AUTHENTICATED BROADBAND OVER POWER LINE COMMUNICATION CHANNELS

(71) Applicant: The Boeing Company, Chicago, IL (US)

(72) Inventors: Su-Nei N. Shen, Bellevue, WA (US); Timothy M. Mitchell, Seattle, WA (US); David S. Mier, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/411,319

(22) Filed: May 14, 2019

(51) Int. Cl.
| | |
|---|---|
| *H02J 1/00* | (2006.01) |
| *H04B 3/54* | (2006.01) |
| *H04B 7/185* | (2006.01) |
| *H04L 29/06* | (2006.01) |
| *G06K 9/00* | (2006.01) |

(52) U.S. Cl.
CPC ..... *H04B 7/18523* (2013.01); *G06K 9/00892* (2013.01); *H04B 3/54* (2013.01); *H04L 63/0861* (2013.01)

(58) Field of Classification Search
CPC .... H04B 2203/5408; H04B 2203/5441; H04B 2203/5445; H04B 2203/5454; H04B 2203/5483; H04B 3/54; H04B 3/56
USPC ...... 455/450, 452.1, 451, 431, 456.1, 456.3, 455/464; 375/257, 222, 355; 370/389, 370/464, 465, 241; 307/9.1, 10.1, 1, 2, 3
See application file for complete search history.

(56) References Cited

U.S. PATENT DOCUMENTS

| | | |
|---|---|---|
| 6,995,658 B2 | 2/2006 | Tustison et al. |
| 7,893,557 B2 | 2/2011 | Davis et al. |
| 8,929,465 B2 | 1/2015 | Lee et al. |
| 8,942,865 B2 | 1/2015 | Kumar et al. |
| 8,948,934 B2 | 2/2015 | Lee et al. |
| 9,100,104 B2 | 8/2015 | Nguyen et al. |
| 9,295,032 B2 | 3/2016 | Kumar et al. |
| 9,350,423 B2 | 5/2016 | Mitchell et al. |
| 9,425,859 B2 | 8/2016 | Mitchell et al. |
| 9,436,569 B2 | 9/2016 | Lee et al. |
| 9,515,700 B2 * | 12/2016 | Sampigethaya ......... H04B 3/54 |

(Continued)

*Primary Examiner* — Tan H Trinh
(74) *Attorney, Agent, or Firm* — Kwan & Olynick LLP

(57) ABSTRACT

Provided are methods and systems for transmission of terrestrial data between aircraft and ground-based systems using broadband over power line (BPL) communication channels. These channels are established based on authentication of biometric data. Specifically, a biometric module, positioned on an aircraft or a gate, receives biometric data from a user and then authenticates this data based on available reference data. The authentication results are used by a BPL module to establish (or not establish) a BPL communication channel. The BPL communication channel is established through an electrical power cable connecting the aircraft to the gate. Furthermore, the BPL communication channel is established through at least a portion of the onboard electrical power distribution system of the aircraft. The terrestrial data, e.g., aircraft control data, in-flight entertainment data, and/or airplane information system data, is then transmitted through this BPL communication channel.

25 Claims, 8 Drawing Sheets

(56) References Cited

U.S. PATENT DOCUMENTS

| | | |
|---|---|---|
| 9,667,316 B2 | 5/2017 | Nguyen et al. |
| 9,930,529 B2 | 3/2018 | Mitchell |
| 2003/0068044 A1* | 4/2003 | Nikolsky ........... B64D 45/0015 380/258 |
| 2004/0267412 A1* | 12/2004 | Arnouse ........... B64D 45/0015 701/2 |
| 2009/0189736 A1* | 7/2009 | Hayashi ................. G06F 21/32 340/5.81 |
| 2011/0191862 A1* | 8/2011 | Mandava .............. H04W 12/08 726/28 |
| 2013/0046422 A1* | 2/2013 | Cabos ................. G08G 5/0034 701/3 |
| 2014/0049099 A1* | 2/2014 | Sampigethaya ......... H04B 3/54 307/1 |
| 2014/0254693 A1 | 9/2014 | Mitchell et al. |
| 2014/0312682 A1 | 10/2014 | Lee et al. |
| 2014/0341309 A1* | 11/2014 | Nguyen .................. H04B 3/54 375/257 |
| 2015/0312257 A1* | 10/2015 | Antipa .................... H04L 63/10 709/225 |
| 2017/0032485 A1* | 2/2017 | Vemury ............... G06Q 50/265 |
| 2017/0053108 A1* | 2/2017 | Jakobsson .............. H04L 63/0861 |
| 2017/0295094 A1* | 10/2017 | Jackson ............. H04L 63/0892 |
| 2017/0295154 A1* | 10/2017 | Jackson ................. H04L 63/06 |
| 2019/0356356 A1* | 11/2019 | Lee ....................... H04B 3/546 |
| 2019/0356510 A1* | 11/2019 | Lee .................... H01R 13/7172 |
| 2019/0392659 A1* | 12/2019 | Seenivasagam ... G06K 9/00268 |

\* cited by examiner

METHODS AND SYSTEMS FOR TRANSMITTING TERRESTRIAL AIRCRAFT DATA USING BIOMETRICALLY AUTHENTICATED BROADBAND OVER POWER LINE COMMUNICATION CHANNELS

BACKGROUND

The amount of data needed for and produced during the operation of aircraft is growing at a rapid pace. This data is used for various cabin systems, avionics systems, and in-flight entertainment (IFE) systems, among other types of systems and applications. Airlines are typically responsible for supplying new data to aircraft and timely downloading of various data, e.g., collected during flights, from the aircraft. All these activities require fast and secure data transfers between aircraft and external networks, while the aircraft are on the ground (e.g., parked at gates). Currently, airports throughout the world use a wide range of communications systems, making it difficult and costly for aircraft travelling among these airports to upload and download data. Furthermore, access to communication channels is not always sufficiently restricted.

What is needed are methods and systems for transmission of terrestrial data between aircraft and ground-based systems that are standardized and secure.

SUMMARY

Provided are methods and systems for transmission of terrestrial data between aircraft and ground-based systems, using broadband over power line (BPL) communication channels. These channels are established based on authentication of biometric data. Specifically, a biometric module, positioned on an aircraft or a gate, receives biometric data from a user and then authenticates this data based on available reference data. The authentication results are used by a BPL module to establish (or not establish) a BPL communication channel. The BPL communication channel is established through an electrical power cable, connecting the aircraft to the gate. Furthermore, the BPL communication channel is established through at least a portion of the onboard electrical power distribution system of the aircraft. The terrestrial data, e.g., aircraft control data, in-flight entertainment data, and/or airplane information system data, is then transmitted through this BPI, communication channel.

Illustrative, non-exclusive examples of inventive features according to present disclosure are described in following enumerated paragraphs:

A1. Method 400 for transmission of terrestrial data 210 between aircraft 100 and ground-based system 300 is provided. Method 400 comprises receiving biometric data 295 at biometric module 206 and authenticating biometric data 295, reby producing authentication results 230. Biometric data 295 is authenticated using biometric module 206 based on authentication reference data 232, associated with BPL communication channel 212 between aircraft 100 and ground-based system 300. Method 400 further comprises establishing BPL communication channel 212 using BPL module 220, electrical power cable 322 connected to aircraft 100 and to ground-based system 300, and at least a portion of onboard electrical power distribution system 110 of aircraft 100, if biometric data 295 is positively authenticated. The portion of onboard electrical power distribution system 110 is electrically coupled to ground-based system 300 by electrical power cable 322. Method 400 comprises transmitting terrestrial data 210 between aircraft 100 and ground-based system 300 using BPL communication channel 212.

A2. Method 400 of paragraph A1, further comprising selecting authentication reference data 232 based on one or more characteristics of BPL communication channel 212.

A3. Method 400 of paragraph A2, wherein the one or more characteristics of BPL communication channel 212 comprise one of a type of terrestrial data 210 for transmission through BPL communication channel 212, a security level of terrestrial data 210 for transmission through BPL communication channel 212, and a type of aircraft module 380 connected to BPL communication channel 212.

A4. Method 400 of any one of paragraphs A1-A3, wherein:
biometric module 206 is gate biometric module 306, which is a part of ground-based system 300,
gate biometric module 306 is connected to and controls operations of cable lock 308; and
cable lock 308 controls at least a portion of electrical power cable 322 and connectivity of electrical power cable 322 to aircraft 100.

A5. Method 400 of paragraph A4, further comprising, prior to establishing BPI, communication channel 212:
unlocking electrical power cable 322 from cable lock 308; and
connecting electrical power cable 322 to aircraft 100.

A6. Method 400 of any one of paragraphs A1-A5, wherein:
biometric module 206 is onboard biometric module 346; and
BPL module 220 is onboard BPL module 360; and
onboard BPL module 360 is directly, inductively, or capacitively coupled to onboard electrical power distribution system 110.

A7. Method 400 of any one of paragraphs A1-A6, further comprising, if authentication of biometric data 295 fails, updating authentication log 233 and determining availability of a manual authentication override.

A8. Method 400 of paragraph A7, further comprising receiving; at biometric module 206, override data and authenticating the override data.

A9. Method 400 of any one of paragraphs A1-A8, further comprising, if biometric data 295 is negatively authenticated, determining if an attempt threshold has been reached.

A10. Method 400 of any one of paragraphs A1-A9, further comprising, if biometric data 295 is negatively authenticated, performing a system lockdown.

A11. Method 400 of any one of paragraphs A1-A10, further comprising, transmitting electrical power to aircraft 100 from ground-based system 300 using electrical power cable 322.

A12. Method 400 of paragraph A11, further comprising, powering BPL module 220 and biometric module 206 using the electrical power transmitted to aircraft 100.

A13. Method 400 of any one of paragraphs A1-A12, wherein establishing BPL communication channel 212 depends on the electrical power transmitted through electrical power cable 322, connected to aircraft 100 and to ground-based system 300.

A14. Method 400 of any one of paragraphs A1-A13, further comprising, prior to establishing BPL communication channel 212, selecting, using BPL module 220, one or more categories of terrestrial data 210 based on biometric data 295 and authentication reference data 232, wherein one or more categories of terrestrial data 210 comprise one of aircraft control data, in-flight entertainment data, and airplane information system data.

A15. Method 400 of paragraph A14, wherein transmitting terrestrial data 210 comprises transmitting one or more categories of terrestrial data 210 selected using BPL module 220.

A16. Method 400 of any one of paragraphs A1-A15, further comprising transmitting authentication results 230 together with terrestrial data 210.

A17. Method 400 of any one of paragraphs A1-A16, further comprising receiving authentication reference data 232 at database 204 communicatively coupled to biometric module 206.

B1. Restricted access communication system 200 for transmission of terrestrial data 210 between aircraft 100 and ground-based system 300 is provided. Restricted access communication system 200 comprises biometric module 206, configured to receive biometric data 295 from user 290 and also configured to authenticate biometric data 295 based on authentication reference data 232, associated with BPL communication channel 212 between aircraft 100 and ground-based system 300; and to produce authentication results 230; and BPL module 220, communicatively coupled to biometric module 206 and configured to receive authentication results 230 from biometric module 206 and also configured to form BPL communication channel 212 based on authentication results 230 received from biometric module 206.

B2. Restricted access communication system 200 of paragraph B1, further comprising database 204, comprising authentication reference data 232, wherein database 204 is a part of or is communicatively coupled to biometric module 206.

B3. Restricted access communication system 200 of paragraph B2, wherein database 204 further comprises authentication log 233 for storing authentication results 230.

B4. Restricted access communication system 200 of paragraph B3, further comprising communication module 202, configured to transmit authentication results 230 to the operator of aircraft 100.

B5. Restricted access communication system 200 of any one of paragraphs B B4, further comprising communication module 202, configured to receive authentication reference data 232 from the operator of aircraft 100.

B6. Restricted access communication system 200 of any one of paragraphs B1-B5, wherein biometric module 206 is configured to select authentication reference data 232 based on one or more characteristics of BPL communication channel 212.

B7. Restricted access communication system 200 of any one of paragraphs B1-B6, further comprising cable lock 308, wherein:

- biometric module 206 is gate biometric module 306, which is a part of ground-based system 300;
- gate biometric module 306 is connected to and controls operations of cable lock 308; and
- cable lock 308 controls at least a portion of electrical power cable 322 and connectivity of electrical power cable 322 to aircraft 100.

B8. Restricted access communication system 200 of any one of paragraphs B1-B7, wherein:

- biometric module 206 is onboard biometric module 346; and
- BPL module 220 is onboard BPI, module 360; and
- onboard BPL module 360 is directly, inductively, or capacitively coupled to onboard electrical power distribution system 110 of aircraft 100.

These and other examples are described further below with reference to the figures.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Data transfer between aircraft and ground-based systems or, more generally, external networks communicatively coupled to the ground-based systems, is essential in modern aviation for efficient, secure, and safe operations of the aircraft. For example, data collected during prior flights is transmitted from an aircraft to an airline, operating this aircraft, for analyzing and determining service and other needs. Furthermore, new data and/or software are uploaded to the aircraft for use during future flights (e.g., new entertainment content, navigational maps, and the like). Often the ground time of an aircraft is limited to maximize the aircraft's utility, and significant amounts of data need to be transferred to and/or from the aircraft in an efficient, secure, and robust manner during the ground time. Wi-Fi and cellular technologies have been proposed for such data transfer to replace traditional paper-based systems and manual transfer of data carriers. However, many such communication options are inconsistent or even unavailable due to technical, business, and regulatory complexities of the airline industry. For example, different designs of aircraft make it difficult to integrate antennas for wireless communications and/or provide new connectors and communication interfaces. Furthermore, wireless frequency bandwidths available for commercial uses differ in different countries and require specialized equipment. As a result, these technologies have seen very limited growth and are insufficient to support growing demands for data transfer. Many airports and airlines still rely on paper systems and manual exchange of data carriers, such as tapes or disks.

At the same time, other areas of the airline industry have gone through a successful standardization. One such area is electrical power supply provided to aircraft at gates in airports. A standard electrical power cable, often referred to as a stinger cable, is used for most types of commercial aircraft. However, other types of cables used in the airline industry for making connections to aircraft are also within the scope. It has been found that these electrical power cables can be also used as a medium for wired data transmission between aircraft and gates using BPL technology.

Figure 1:
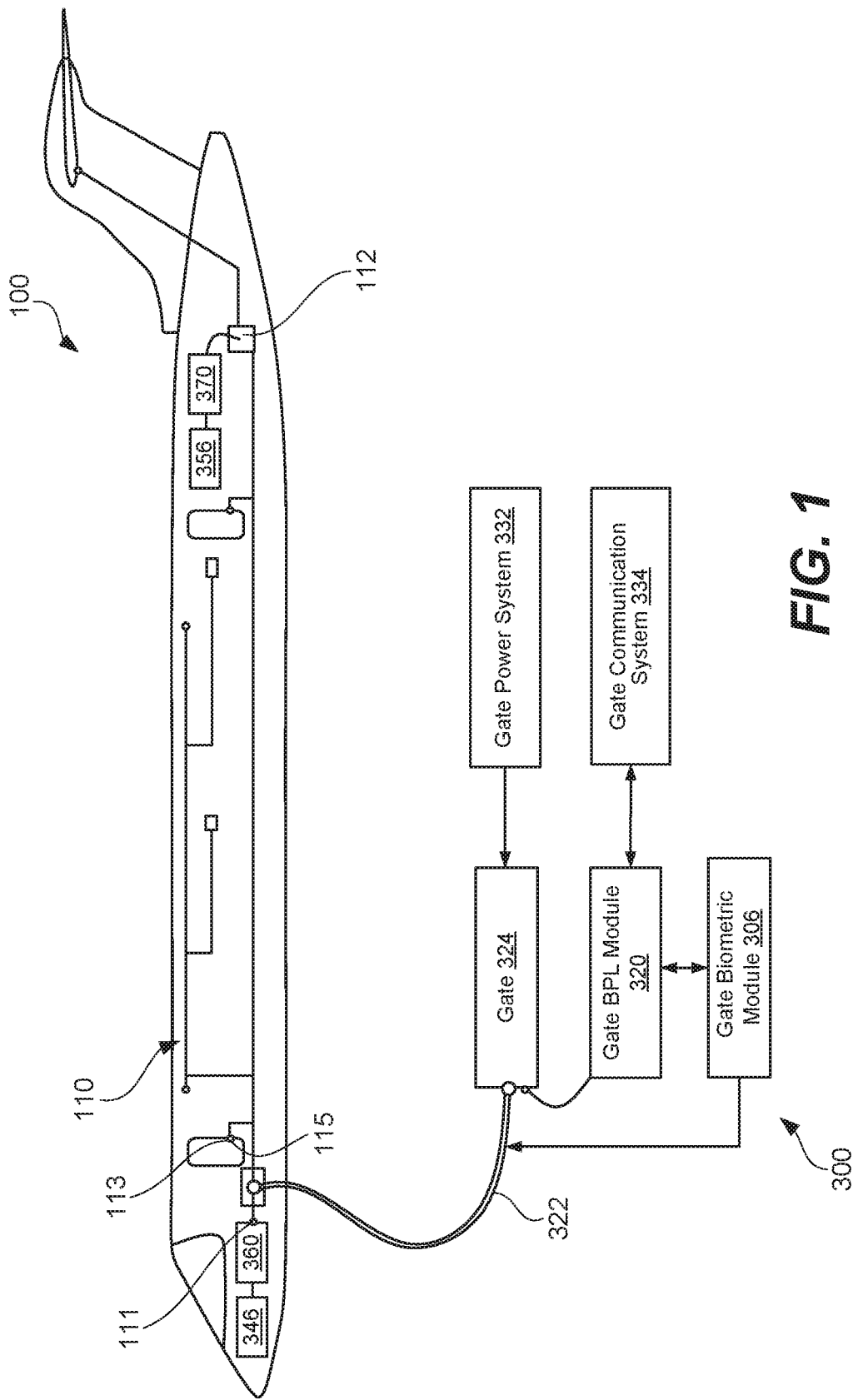
FIG. 1 is a schematic representation of an aircraft, connected to a ground-based system using a power cable and configured to establish one or more BPL communication channels through the power cable, in accordance with some examples.

FIG. 1 is a schematic illustration of aircraft 100 parked at and connected to gate 324 using electrical power cable 322. Aircraft 100 is equipped with electrical power connectors for making these connections to electrical power cable 322. In some examples, electrical power cable 322 is a standardized power cable suitable for different types of aircraft and is an insulated, flexible, all weather extension cord used to supply 3 phase, 400 Hz, 115 VAC electrical power. Electrical power cable 322 can transmit an electrical current of at least about 50A in each phase. In some examples, electrical power cable 322 is between about 10 feet and 500 feet long and nearly 2 inches in diameter.

Gate 324 is a part of ground-based system 300, which, in some examples, also comprises gate BPL module 320, gate electrical power system 332, gate communication system 334, and/or gate biometric module 306. Gate BPL module 320 is communicatively coupled to gate communication system 334, which is further connected to one or more external networks, such as airline network, airport network, aircraft manufacturer network, and the like. Gate BPL module 320 is configured to form BPL link with aircraft 100 and to transmit terrestrial data between aircraft and gate communication system 334. Gate BPL module 320 is directly, capacitively, or inductively coupled to electrical power cable 322. Gate electrical power system 332 is electrically coupled to electrical power cable 322, which is configured to supply electrical power to aircraft 100. In some examples, gate electrical power system 332 comprises frequency converters, transformers, and/or other like electrical power equipment.

Gate biometric module 306, when present, is used to control operation of gate BPL module 320. For example, gate BPL module 320 forms a BPL communication link with aircraft 100 based on authentication results 230 produced by gate biometric module 306. Other components and features of ground-based system 300 are described below with reference to FIGS. 2 and 3A.

Aircraft 100 comprises onboard electrical power distribution system 110, which is electrically coupled to electrical power cable 322 when electrical power cable 322 is connected to aircraft 100. Onboard electrical power distribution system 110 interconnects various components within aircraft 100, e.g., power outlet 115. Aircraft 100 comprises onboard BPL module 360, which is directly, inductively, or capacitively coupled to onboard electrical power distribution system 110 at first connection location 111. Onboard BPL module 360 is controlled by onboard biometric module 346, when one is present. Overall, the system includes at least one biometric module, e.g., onboard biometric module 346 and/or gate biometric module 306.

FIG. 1 also illustrates additional onboard BPL module 370, which is inductively or capacitively coupled to onboard electrical power distribution system 110 at second connection location 112. Additional onboard BPL module 370 is controlled by additional onboard biometric module 356. Other connection points are available, such as third connection point 113, which is power outlet 115 in this example.

Examples of Restricted Access Communication Systems

Figure 2:
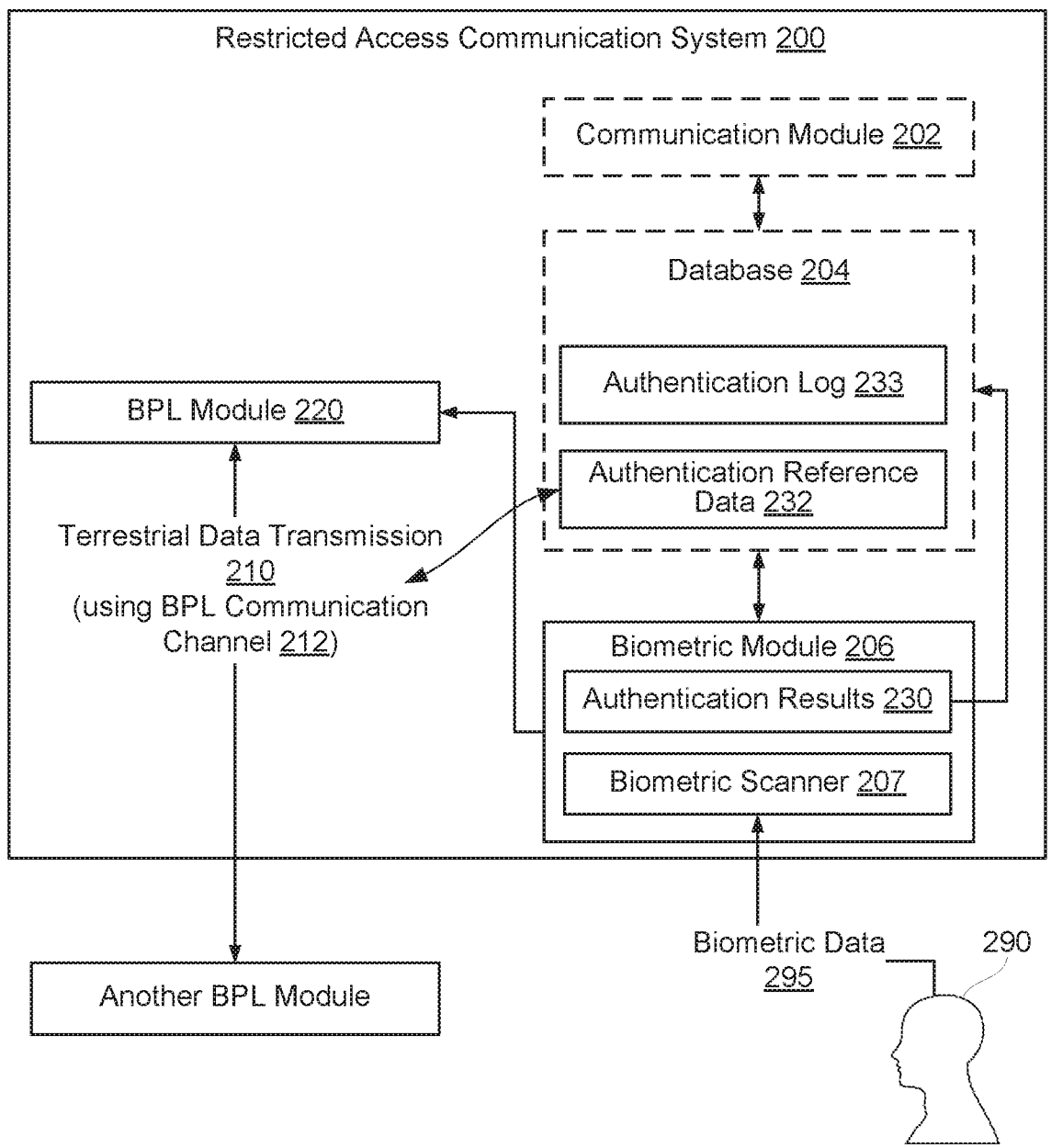
FIG. 2 is a schematic representation of a restricted access communication system for use at an aircraft or at a ground-based system and configured to establish one or more BPL communication channels based on authentication of biometric data, in accordance with some examples.

FIG. 2 is a schematic illustration of restricted access communication system 200 for transmission of terrestrial data 210 between aircraft 100 and ground-based system 300, in accordance with some examples. In some examples, restricted access communication system 200 is a part of ground-based system 300, as further described below with reference to FIG. 3A. In other examples, restricted access communication system 200 is a part of aircraft 100, as further described below with reference to FIG. 3B. In further examples, one restricted access communication system 200 is a part of ground-based system 300, while another restricted access communication system 200 is a part of aircraft 100.

Restricted access communication system 200 comprises biometric module 206 and BPL module 220. In some examples, biometric module 206 and BPL module 220 are separate hardware components. Alternatively, biometric module 206 and BPL module 220 are parts of the same computer system, various examples of which are described below with reference to FIG. 7.

Biometric module 206 is configured to receive biometric data 295 from user 290, such as aircraft crew (pilots, flight attendants), maintenance crew, airport operators, and the like. Biometric module 206 is equipped with biometric scanner 207, such as a face recognition scanner, an iris recognition scanner, a fingerprint scanner, a voice recognition scanner, and a hand geometry scanner. A face recognition scanner comprises a camera and is configured to measure unique patterns of a user's face by analyzing facial contours and comparing these facial contours to authentication reference data 232. An iris recognition scanner comprises a camera and is configured to identify unique patterns of a user's iris and compare these patterns to authentication reference data 232. A fingerprint scanner is configured to capture unique patterns of ridges and valleys on a user's finger and compare these features to authentication reference data 232. A voice recognition scanner comprises a microphone and is configured to measure unique sound waves in a user's voice and compare these features to authentication reference data 232. A hand geometry scanner is configured to measure and record the length, thickness, width, and/or surface area of a user's hand. Other types of biometric scanners 207 are also within the scope. In some examples, biometric module 206 is equipped with multiple biometric scanners used for receiving different types of biometric data 295 (e.g., a combination of an iris scan and a fingerprint scan).

Biometric module 206 is also configured to authenticate biometric data 295 based on authentication reference data 232. In some examples, authentication reference data 232 is collected from authorized users 290 of restricted access communication system 200. Different types of users 290 can have different levels of security clearance and authentication of biometric data 295 is associated with these security levels.

In some examples, authentication reference data 232 is further associated with BPL communication channel 212 to be established between the aircraft 100 and the gate communication system 334. For example, different security levels of authentication reference data 232 allow establishing different types of BPL communication channels 212 and transmitting different types of terrestrial data 210. For example, a BPL communication channel used for transmission of in-flight entertainment data can be established using a lower level of authentication reference data 232, while a BPL communication channel used for transmission of airplane information system data requires higher level data. Overall, biometric module 206 is configured to select authentication reference data 232 based on one or more characteristics of BPL communication channel 212.

Referring to FIG. 2, BPL module 220 is communicatively coupled to biometric module 206 and configured to receive authentication results 230 from biometric module 206. BPL module 220 is also configured to form BPL communication channel 212, e.g., with another BPL module. BPL communication channel 212 is formed based on authentication results 230 received from biometric module 206.

Referring to FIG. 2, restricted access communication system 200 also comprises database 204. In some examples, database 204 is used to store authentication reference data 232, authentication log 233 (comprising authentication results 230), and other data. In some examples, database 204 is a part of or is communicatively coupled to biometric module 206. Biometric module 206 has access to authentication reference data 232 while performing authentication of biometric data 295 and is able to store authentication results 230 upon completion of the authentication.

Referring to FIG. 2, restricted access communication system 200 further comprises optional communication module 202. When present, communication module 202 is used to form communication channels that are different from BPL communication channels formed by BPL module 220. More specifically, communication module 202 is configured to transmit authentication results 230 to an operator of aircraft 100. In the same or other examples, communication module 202 is configured to receive authentication reference data 232 from an operator of aircraft 100. In some examples, authentication results 230 and/or authentication reference data 232 are transmitted using a BPL communication channel established by BPL module 220.

Figure 3A:
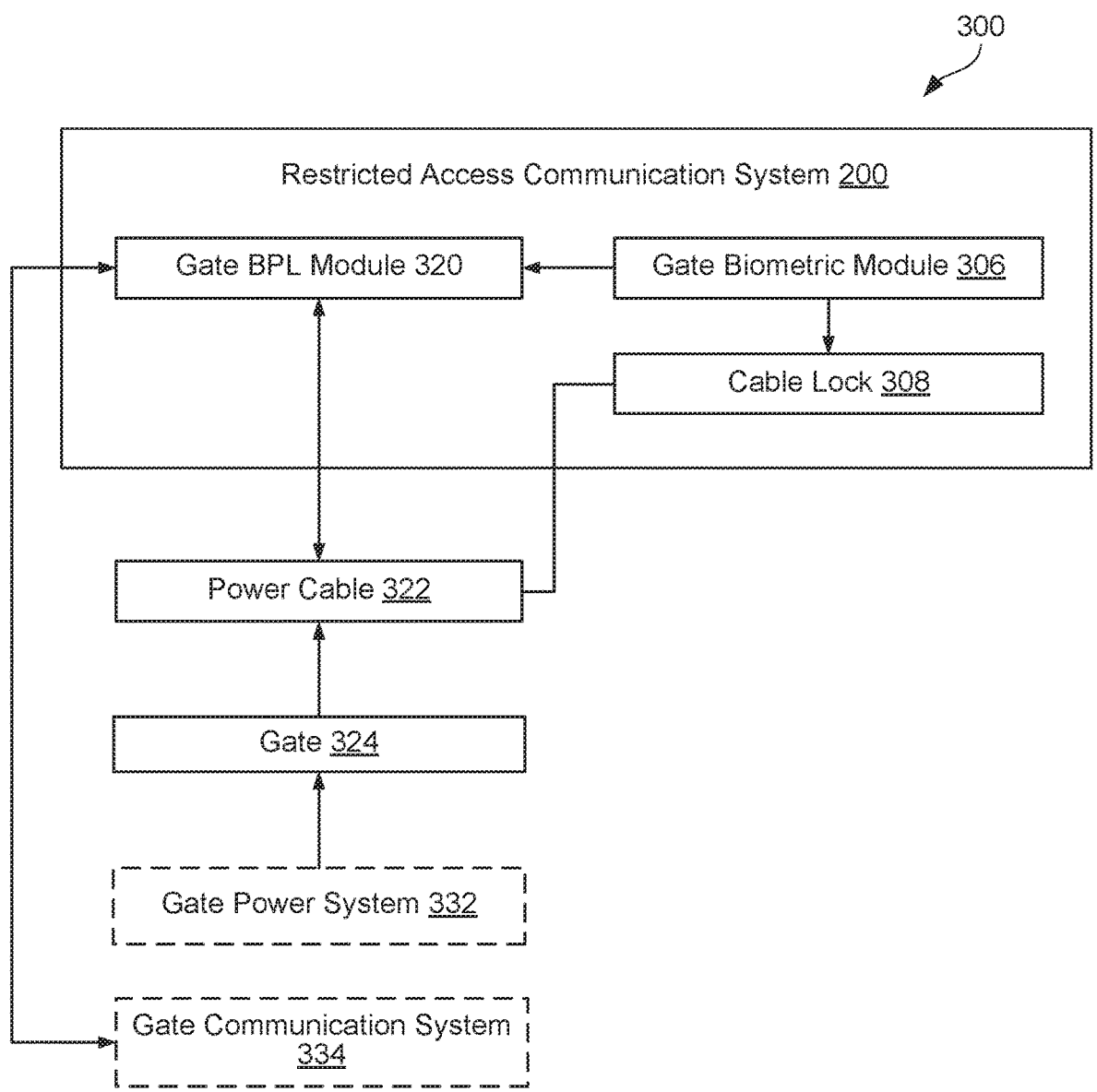
FIG. 3A is a schematic representation of the restricted access communication system of FIG. 2, implemented as a part of the ground-based system, in accordance with some examples.

Referring to FIG. 3A, in some examples, restricted access communication system 200 is a part of ground-based system 300. In these examples, biometric module 206 is referred to as gate biometric module 306, while BPL module 220 is referred to as gate BPL module 320. Furthermore, in some examples, restricted access communication system 200 comprises cable lock 308, which controls at least a portion of electrical power cable 322 and connectivity of electrical power cable 322 to aircraft 100.

In addition to various features of biometric module 206 described above, gate biometric module 306 is connected to and controls operations of cable lock 308. For example, depending on authentication results 230, gate biometric module 306 instructs cable lock 308 to remain locked or to unlock. Once cable lock 308 is unlocked, electrical power cable 322 can be retrieved from cable lock 308 and connected to aircraft 100. It should be noted that BPL communication channel 212 between ground-based system 300 and aircraft 100 can be only established when electrical power cable 322 is connected to aircraft 100.

As described above, electrical power cable 322 is connected to gate 324 and receives electrical power from gate electrical power system 332. A BPL communication channel is restricted to ground-based system 300 and does not propagate past gate electrical power system 332. Gate BPL module 320 is communicatively coupled to gate communication system 334, which includes external networks.

Figure 3B:
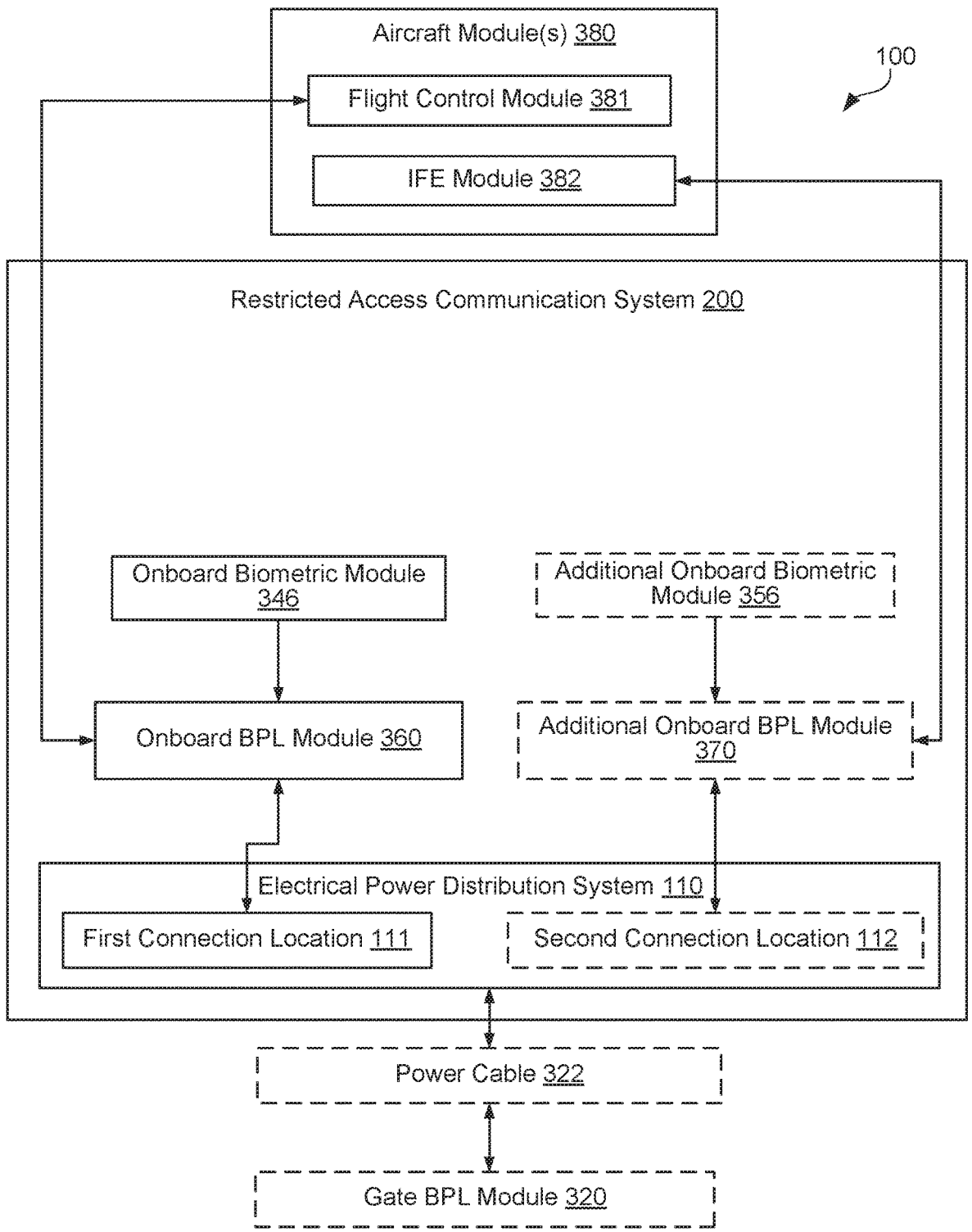
FIG. 3B is a schematic representation of the restricted access communication system of FIG. 2, implemented as apart of the aircraft, in accordance with some examples.

Referring to FIG. 3B, in some examples, restricted access communication system 200 is a part of aircraft 100. In these examples, biometric module 206 is referred to as onboard biometric module 346, while BPL module 220 is referred to as onboard BPL module 360. Onboard BPL module 360 is directly, inductively, or capacitively coupled to onboard electrical power distribution system 110, e.g., at first connection location 111. During the data transmission, onboard electrical power distribution system 110 is electrically coupled to electrical power cable 322, thereby providing a BPL communication channel to gate BPL module 320.

Onboard BPL module 360 is communicatively coupled to one or more of aircraft modules 380, such as flight control module 381 and IFE module 382. Specifically, onboard BPL module 360 is configured to transmit terrestrial data 210 between one or more of aircraft modules 380 and ground-based system 300.

Referring to FIG. 3B, in some examples, restricted access communication system 200 also comprises additional onboard biometric module 356 and additional onboard BPL module 370, controlled by additional onboard biometric module 356. Additional onboard BPL module 370 is connected at a different location of onboard electrical power distribution system 110, e.g., at second connection location 112. Similar to onboard BPL module 360, additional onboard BPL module 370 is configured to transmit terrestrial data 210 between one or more of aircraft modules 380 and ground-based system 300. In some examples, additional onboard BPL module 370 is configured to transmit terrestrial data 210 to and from onboard BPL module 360.

Examples of Transmission Methods

Figure 4A:
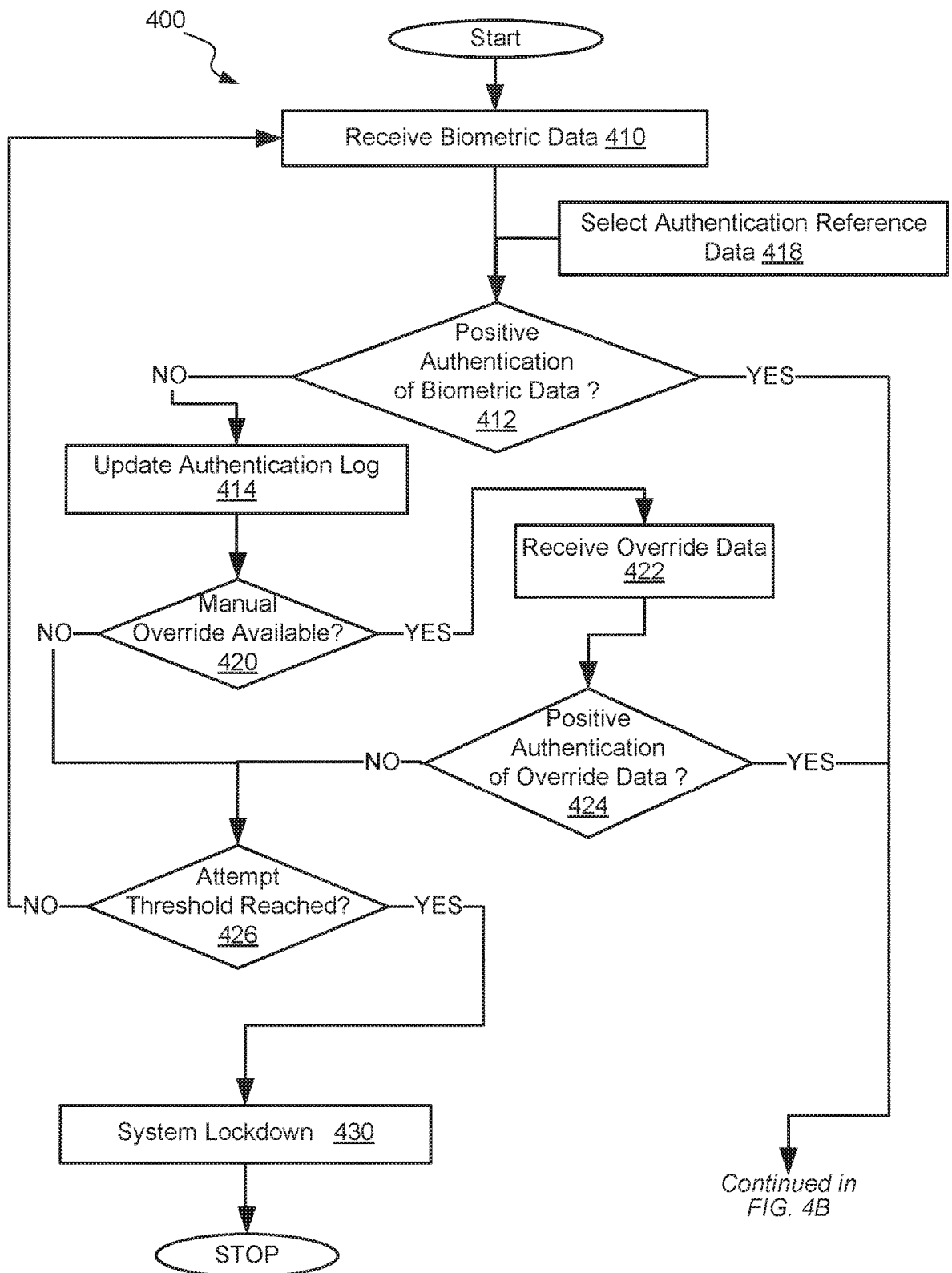
FIGS. 4A and 4B illustrate a process flowchart corresponding to a method for transmission of terrestrial data between an aircraft and a ground-based system using the restricted access communication system of FIG. 2, in accordance with some examples.
Figure 4B:
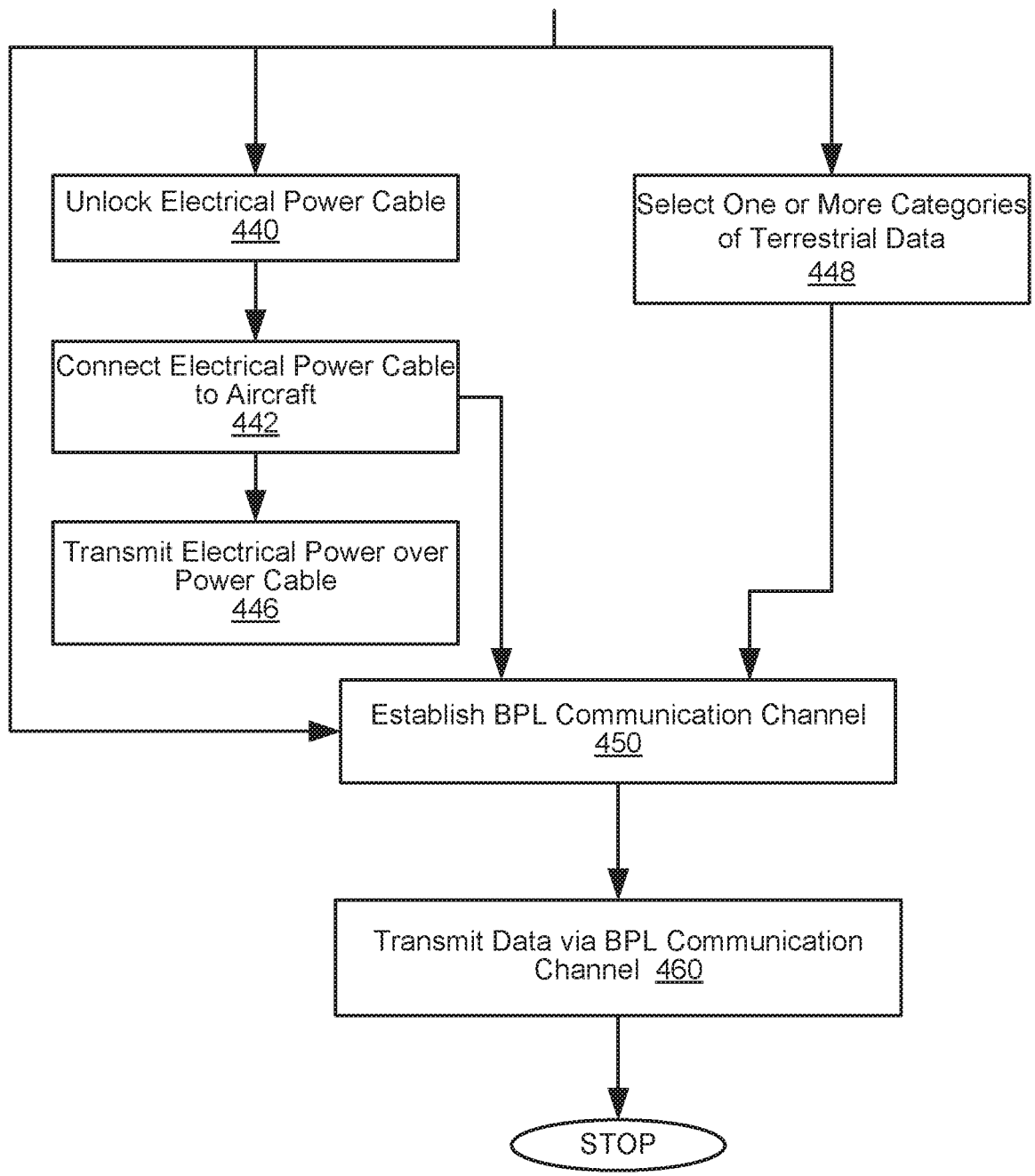

FIGS. 4A and 4B illustrate a process flowchart corresponding to method 400 for transmission of terrestrial data 210 between aircraft 100 and ground-based system 300. More specifically, terrestrial data 210 is transmitted between one or more aircraft modules 380 and gate communication system 334 using one or more BPL communication channels established through electrical power cable 322, connecting aircraft 100 to gate 324. Various examples of aircraft 100 and ground-based system 300 are described above with reference to FIGS. 1, 3A and 3B. Different types of terrestrial data 210 are within the scope, such as aircraft control data, in-flight entertainment data, and airplane information system data. Terrestrial data 210 is transmitted from aircraft 100 to ground-based system 300 and/or from ground-based system 300 to aircraft 100. Furthermore, in some examples, terrestrial data 210 is transmitted while also transmitting electrical power around-based system 300 to aircraft 100.

Method 400 comprises receiving (block 410) biometric data 295 at biometric module 206. Various examples of biometric data 295 are described above, such as fingerprints and the like. During this operation, user 290 interacts with biometric module 206, equipped with one or more biometric scanners 207. User 290 supplies biometric data 295 to biometric module 206. In some examples, multiple different types of biometric data 295 are received by biometric module 206, e.g., a combination of a fingerprint scan and an iris scan. More specifically, a cross-reference between these different types of biometric data 295 is performed by biometric module 206, e.g., during the authentication described below. Furthermore, in some examples, biometric module 206 receives additional non-biometric authentication data, e.g., a password, private key code, badge scan, and the like. More specifically, this additional authentication data is cross-referenced with biometric data 295.

Method 400 proceed with authenticating (block 412) biometric data 295, thereby producing authentication results 230. This authentication operation is performed using biometric module 206 and is based on authentication reference data 232, available at or retrieved by biometric module 206. In some examples, authentication reference data 232 is associated with BPL communication channel 212, to be formed between aircraft 100 and gate communication system 334, or more specifically with the type of BPL communication channel 212 and/or the type of terrestrial data 210 to be transmitted using BPL communication channel 212. For example, WE data can be transmitted using less secure channels than aircraft control data or airplane information system data. Therefore, in some examples, different types of BPL communication channels 212 and/or different types of terrestrial data 210 require different security levels and different types of authentication reference data 232.

In some examples, prior to authenticating (block 412) biometric data 295, method 400 proceeds with selecting (block 418) authentication reference data 232 based on one or more characteristics of BPL communication channel 212. Some examples of these characteristics include, but are not limited to, the type of terrestrial data 210, the security level of terrestrial data 210, the type of aircraft module 380 connected to BPL communication channel 212, and the like. For example, a fingerprint scanner can be configured to require different match levels based on this selection. In the same or other examples, authentication reference data 232 is selected for different users with different security access levels.

If biometric data 295 is positively authenticated/authentication results 230 are positive, method 400 proceeds with establishing (block 450) BPL communication channel 212. BPL communication channel 212 is established by BPL module 220, connected to biometric module 206, and uses electrical power cable 322 to connect aircraft 100 and also to ground-based system 300. BPL communication channel 212 is also established using at least a portion of an onboard electrical power distribution system 110 of aircraft 100. This portion of onboard electrical power distribution system 110 is electrically coupled to ground-based system 300 by electrical power cable 322.

For example, one BPL module is gate BPL module 320 (FIG. 3A), while another BPL module is onboard BPL module 360 (FIG. 3B). Gate BPL module 320 and onboard BPL module 360 together establish BPL communication channel 212 for transmission of terrestrial data 210 between aircraft 100 and ground-based system 300. Collection and authentication of biometric data 295 is performed either onboard the aircraft (e.g., using biometric module 206, which is onboard biometric module 346 in this example), at ground-based system 300 (e.g., using biometric module 206, which is gate biometric module 306 in this example), or both (e.g., using two biometric modules 206, one of which is onboard biometric module 346 and another one is gate biometric module 306).

One or more onboard BPL modules and gate BPL module 320 are configured to establish one or more BPL communication channels between aircraft 100 and gate 324. Various data domains available on aircraft 100, gate 324, and/or gate communication system 334 are transmitted through these BPL communication channels while electrical power cable 322 is connected to both aircraft 100 and gate 324. In some examples, data transmission and power transmission are performed at the same time using the same conductor. Data and power are transmitted using different frequency bands (e.g., 400 Hz for power and 2-80 MHz for data), which minimizes interference between these two transmissions. Furthermore, each BPL communication channel operates using its own frequency band that is different from frequency bands of any other channels.

The BPL communication channels are configured to provide secure data transfer in comparison to other types of communication links that are currently available in the airport environment. Specifically, data signals transferred through the BPL communication channels are restricted to electrical power cable 322 and a few other electrical power components that operate at a certain frequency, for example, 400 Hz. All of these electrical power components are typically located within airport areas having restricted access. The data signals will be blocked by frequency converters, transformers, and other such electrical power components. The data signal is effectively contained within a small portion of the overall power system that is connected to an aircraft. In some examples, security within BPL communication channels is further enhanced by encryption and other like technologies. Furthermore, operation of gate BPL module 320 and onboard BPL module 360 is controlled and restricted by respective biometric modules.

In some examples, BPL communication channels are created by impressing a modulated carrier signal on a portion of the electrical power system extending between aircraft 100 and gate 324 and including electrical power cable 322. Gate BPL module 320 and onboard BPL modules 360 are used for impressing such signals on individual conductors of electrical power cable 322 when transmitting data. The same modules are also used for extracting data from these signals when receiving data. In some examples, different overall frequency bands are used depending on the transmission distance and data rate requirements, such as between about 1 kHz and 500 MHz or, more specifically, between 2 MHz and 80 MHz. The overall frequency band is then divided into individual frequency bands for each BPL communication channel. Because the electrical current used to power the aircraft and the electrical current used for data transmission use different frequencies, very little if any interference occurs between data and power transmissions. In some examples, the data transfer rate is at least 15 Mbit per second or, more specifically at least 500 Mbit per second. It has been found that the data transfer rate is affected by electrical power transmission through the cable and is 5-20% lower when the electrical power is transmitted. This increase in data rates with an unpowered cable could be a useful characteristic to control the data transfer. For example, the power transmission state is used to characterize the data transmission and, more specifically, to ensure the security. More specifically, in some examples, selected data types are only transmitted while also transmitting the electrical power or while not transmitting the electrical power.

In some examples, BPL communication channels follow one of the established or developing standards, such as IEEE 1901 or ITU-T's G.hn specification. For example, one or two of the following physical layers are used in a protocol: a fast Fourier transform orthogonal frequency-division multiplexing modulation layer and a wavelet orthogonal frequency-division multiplexing modulation layer. The first one of these layers includes a forward error correction scheme based on a convolutional turbo code. The second one of these layers includes a mandatory forward error correction based on a concatenated Reed-Solomon and convolutional code. On top of these two physical layers, one or more media access control (MAC) layers is defined. For example, one MAC layer is used for local networking, while another one is used for access networking. To manage coexistence of multiple physical layers and MAC layers, an inter-system protocol is used. The protocol is used so that various BPL devices, such as the gate BPL module and the aircraft BPL module, can share communication resources, such as frequency/time. A common electrical wiring is used for Orthogonal Frequency Division Multiplexed (OFDM) and Time Division Multiple Access (TDMA) modulation schemes.

Alternatively, if authentication of biometric data 295 fails, method 400 either terminates or proceeds with one or more optional operations, which will now be described in more details. In some examples, method 400 proceeds with updating (block 414) authentication log 233. As described above, authentication log 233 is stored in database 204, which is a part of or communicatively coupled to biometric module 206. Authentication log 233 is updated with authentication results 230 and, in some examples, with biometric data 295 (e.g., for further investigation).

Continuing with biometric data 295 failing authentication, in some examples, method 400 proceeds with determining (block 420) availability of a manual authentication override. When available, the manual authentication override is a backup/alternative when biometric data 295 cannot be received or positively authenticated (e.g., biometric equipment malfunction, user unavailability, and the like).

If the manual override is available, biometric module 206 informs user 290 about this option and, in some examples, method 400 proceeds with receiving (block 422) override data. Some examples of the override data are passwords, private key, card scans, and the like. Biometric module 206 comprises various input components (e.g., keyboard, touch screen, card reader, etc.) used in this operation.

Method 400 proceeds with authenticating (block 424) the override data. In some examples, this authentication operation is also performed using authentication reference data 232. In some examples, authentication log 233 is updated with the override authentication results and, more specifically, with the override data. Similar to the biometric data authentication, different subsets of authentication reference data 232 are used for the override data authentication. If the override data is positively authenticated, method 400 proceeds with establishing (block 450) BPL communication channel 212.

In some examples, method 400 allows user 290 to perform multiple attempts to provide biometric data 295 and/or the override data, e.g., if one or more authentication attempts fail. In these examples, method 400 involves determining (block 426) if an attempt threshold has been reached. The threshold applies to authentication attempts of biometric data 295, authentication attempts of the override data, or both. If the attempt threshold has not been reached, method 400 is repeated, in some examples.

In some examples, if all authentication attempts were negative and/or the attempt threshold has been reached, method 400 proceeds with performing (block 430) a system lockdown. In these examples, once the system lockdown is complete, restricted access communication system 200 will not receive biometric data 295 and/or the override data and will not establish any BPL communication channels.

In some examples, the authentication is performed at ground-based system 300. More specifically, biometric module 206 is gate biometric module 306, connected to and controlling operations of cable lock 308. In these examples, cable lock 308 controls at least a portion of electrical power cable 322 and connectivity of electrical power cable 322 to aircraft 100. Cable lock 308 remains locked or unlocked depending on authentication results 230 as further described below. For example, prior to establishing (block 450) BPL communication channel 212, method 400 also comprises unlocking (block 440) electrical power cable 322 from cable lock 308 and connecting (block 442) electrical power cable 322 to aircraft 100.

After BPL communication channel 212 is established (block 450), method 400 proceeds with transmitting (block 460) terrestrial data 210 between aircraft 100 and gate communication system 334 using BPL communication channel 212.

In some examples, method 400 further comprises transmitting (block 446) electrical power to aircraft 100 from ground-based system 300 using electrical power cable 322. Furthermore, in some examples, method 400 further comprises powering BPL module 220 and biometric module 206 using electrical power transmitted to aircraft 100. In some examples, establishing BPL communication channel 212 (as shown by block 450) depends on electrical power transmitted through electrical power cable 322, connected to aircraft 100 and to ground-based system 300.

In some examples, method 400 further comprises selecting (block 448) one or more categories of terrestrial data 210 based on biometric data 295 and authentication reference data 232. This operation is performed using BPL module 220 and prior to establishing (block 450) BPL communication channel 212. The one or more categories of terrestrial data 210 comprise one or more of aircraft control data, in-flight entertainment data, and airplane information system data. In these examples, transmitting (block 460) terrestrial data 210 comprises transmitting one or more categories of terrestrial data 210 selected using BPL module 220. In some examples, method 400 further comprises transmission of authentication results 230 together with terrestrial data 210 or at least using the same BPL communication channel.

Aircraft Examples

Figure 5:
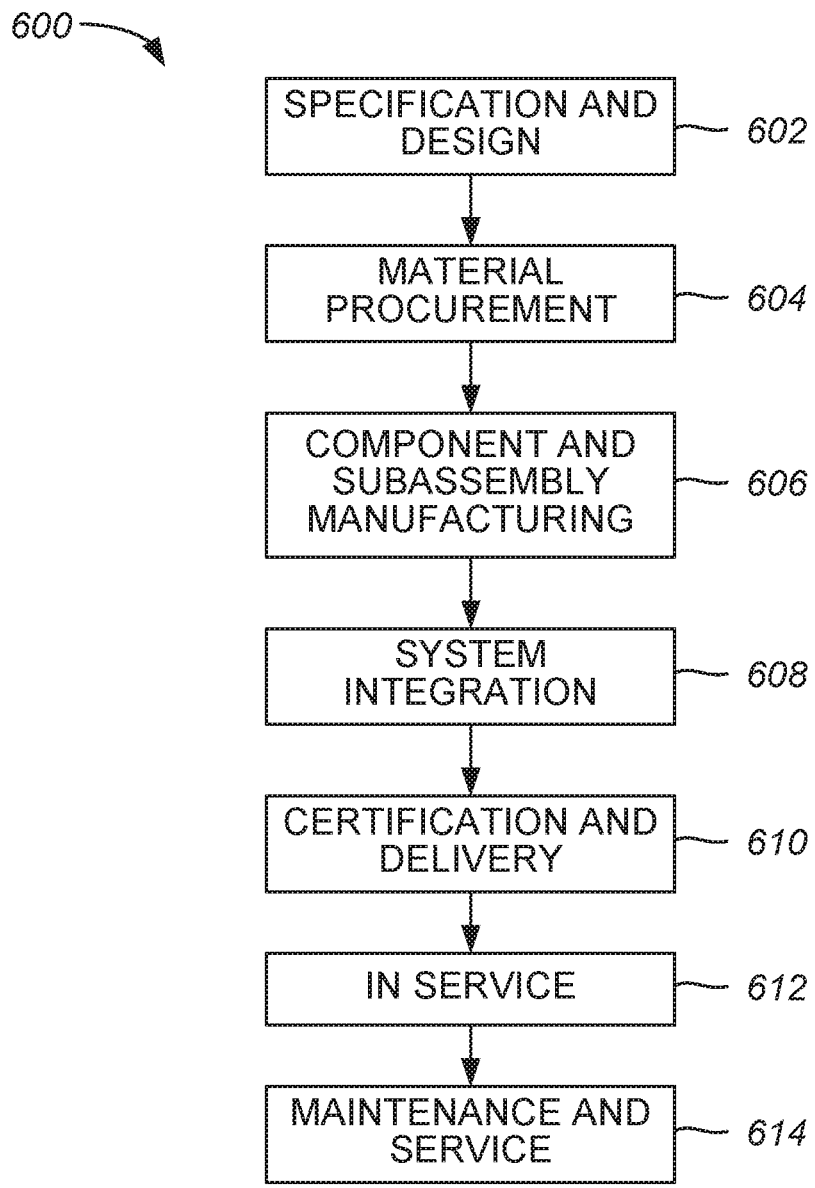
FIG. 5 is a process flowchart illustrating key operations of aircraft manufacturing and service, in accordance with some examples.

An aircraft manufacturing and service method 600 shown in FIG. 5 and aircraft 100 shown in FIG. 6 will now be described to better illustrate various features of methods and systems for transmission of terrestrial data using BPL communication links presented herein. During pre-production, aircraft manufacturing and service method 600 includes developing specification and design 602 of aircraft 100 and performing material procurement 604. Integration of BPL communication modules and biometric modules into aircraft 100 are considered during these operations. The production phase involves fabricating component and subassembly manufacturing 606 and system integration 608 of aircraft 100. Thereafter, aircraft 100 proceed through certification and delivery 610 in order to be placed in service 612. While in service by a customer, aircraft 100 is scheduled for routine maintenance and service 614, which also includes modification, reconfiguration, refurbishment, and other like operations. While the examples described herein relate generally to servicing of commercial aircraft, they may be practiced at other stages of the aircraft manufacturing and service method 600.

Each of the processes of aircraft manufacturing and service method 600 is performed or carried out by a system integrator, a third party, and/or an operator (e.g., a customer). For the purposes of this description, a system integrator includes, without limitation, any number of aircraft manufacturers and major-system subcontractors; a third party includes, for example, without limitation, any number of vendors, subcontractors, and suppliers; and an operator is an airline, leasing company, military entity, service organization, and so on.

Figure 6:
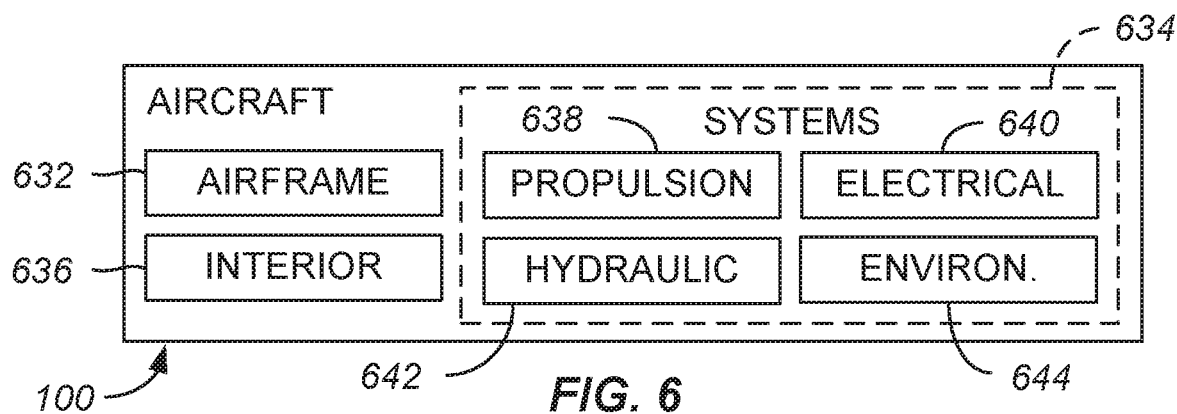
FIG. 6 is a block diagram illustrating various components of an aircraft, in accordance with some examples.

As shown in FIG. 6, aircraft 100 produced by aircraft manufacturing and service method 600 includes airframe 632, interior 636, and multiple systems 634. Examples of systems 634 include one or more of propulsion system 638, electrical system 640, hydraulic system 642, and environmental system 644. Electrical system 640 comprises onboard electrical power distribution system 110. Any number of other systems is included in this example. Although an aircraft example is shown, the principles of the disclosure are applied to other industries, such as the automotive industry.

Systems and methods embodied herein are employed, in some examples, during any one or more of the stages of aircraft manufacturing and service method 600. For example, components or subassemblies are fabricated or manufactured in a manner similar to components or subassemblies produced while aircraft 100 is in service. Furthermore, the methods and systems are utilized during component and subassembly manufacturing 606 and system integration 608, for example, for expediting assembly of or reducing the cost of aircraft 100. Similarly, the methods and systems are utilized while aircraft 100 is in service, for example, for maintenance and service 614.

Examples of Computer Systems

Figure 7:
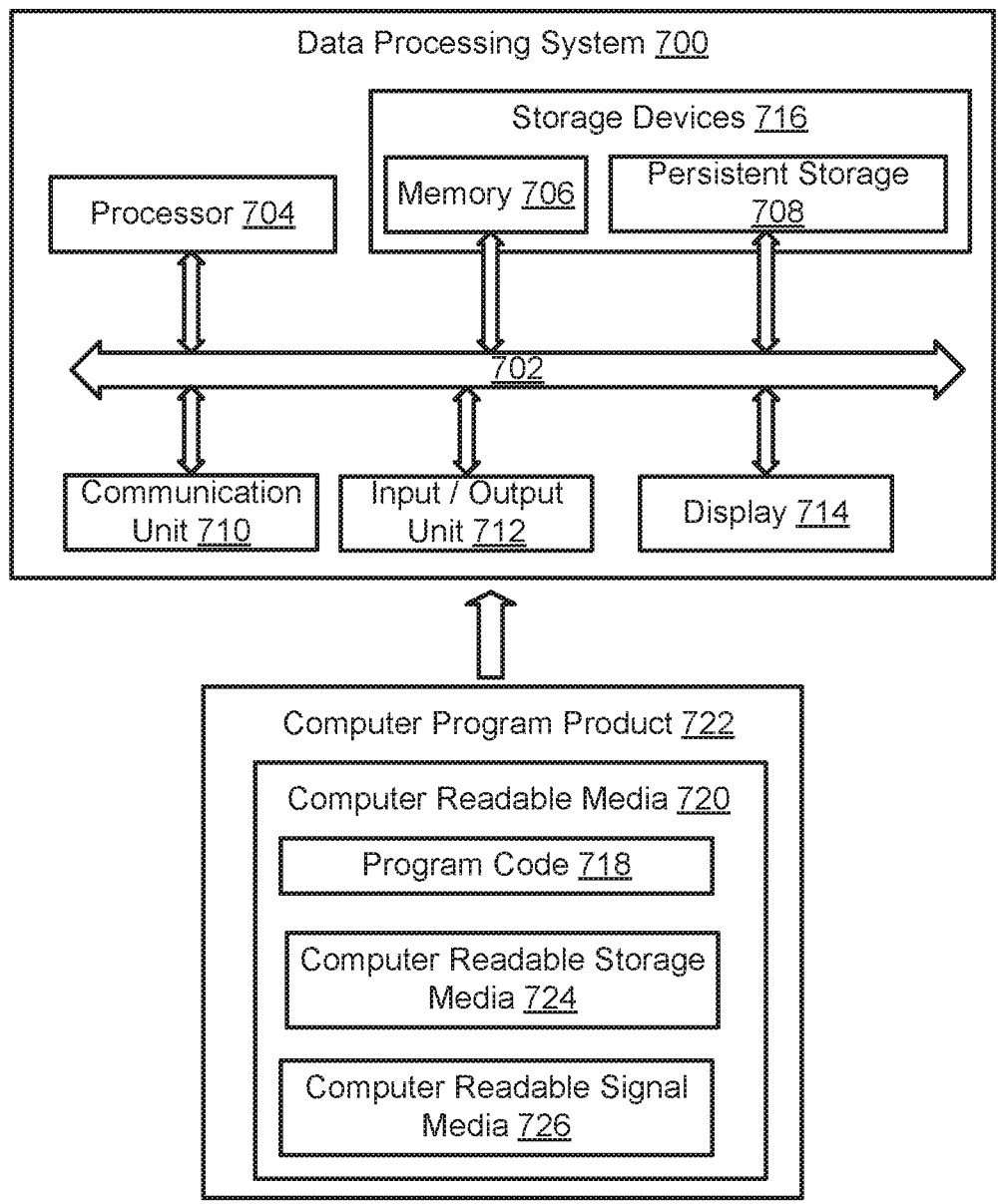
FIG. 7 is a block diagram illustrating a data processing system used for terrestrial data transmission between an aircraft and an external network, in accordance with some examples.

Turning now to FIG. 7, an illustration of a data processing system 700 is depicted, in accordance with some examples. Data processing system 700 is used to implement one or more computers used in a controller or other components of various systems described above, such as biometric modules, BPL communication modules, aircraft computer systems, gate computer systems, computer systems of external networks, and the like. In some examples, data processing system 700 includes communications framework 702, which provides communications between processor unit 704, memory. 706, persistent storage 708, communication unit 710, input/output unit 712, and display 714. In this example, communications framework 702 takes the form of a bus system.

Processor unit 704 serves to execute instructions for software that is loaded into memory 706. In some examples, processor unit 704 is a collection of processors, a multi-processor core, or some other type of processor, depending on the particular implementation.

Memory 706 and persistent storage 708 are examples of storage devices 716. A storage device is any piece of hardware that is capable of storing information, for example and without limitation, data, program code in functional form, and/or other suitable information either on a temporary basis and/or a permanent basis. Storage devices 716 are referred to as computer readable storage devices in these illustrative examples. Memory 706 is a random access memory or any other suitable volatile or non-volatile storage device. Persistent storage 708 takes various forms, depending on the particular implementation. For example, persistent storage 708 contains one or more components or devices, such as a hard drive, a flash memory, a rewritable optical disk, a rewritable magnetic tape, or some combination of the above. In some examples, the media used by persistent storage 708 is removable. For example, a removable hard drive is used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that are connected to data processing system 700. For example, input/output unit 712 provides a connection for user input through a keyboard, a mouse, and/or some other suitable input device. Further, input/output unit 712 sends output to a printer. Display 714 provides a mechanism to display information to a user.

Instructions for the operating system, applications, and/or programs are located in storage devices 716, which are in communication with processor unit 704 through communications framework 702. The processes of the different examples are performed by processor unit 704 using computer-implemented instructions, which are located in a memory, such as memory 706.

These instructions are referred to as program code, computer usable program code, or computer readable program code that is read and executed by a processor in processor unit 704. The program code in the different examples is embodied on differ physical or computer readable storage media, such as memory 706 or persistent storage 708.

Program code 718 is located in a functional form on computer readable media 720 that is selectively removable and is loaded onto or transferred to data processing system 700 for execution by processor unit 704. Program code 718 and computer readable media 720 form computer program product 722 in these illustrative examples. In one example, computer readable media 720 is computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 is transferred to data processing system 700 using computer readable signal media 726. Computer readable signal media 726 is, for example, a propagated data signal containing program code 718. For example, computer readable signal media 726 is an electromagnetic signal, an optical signal, and/or any other suitable type of signal. These signals are transmitted over communications links, such as wireless communications links, optical fiber cable, coaxial cable, a wire, and/or any other suitable type of communications link.

The different components illustrated for data processing system 700 are not meant to provide architectural limitations to the manner in which different examples are implemented. The different illustrative examples are implemented in a data processing system including components in addition to and/or in place of those illustrated for data processing system 700. Other components shown in FIG. 7 can be varied from the illustrative examples shown. The different examples are implemented using any hardware device or system capable of running program code 718.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method for transmission of terrestrial data between an aircraft and a ground-based system, the method comprising:
receiving biometric data at a biometric module;
authenticating the biometric data, thereby producing authentication results, wherein the biometric data is authenticated using the biometric module based on authentication reference data, associated with a BPL communication channel between the aircraft and the ground-based system;
selecting one or more categories of the terrestrial data based on the authentication results, wherein the one or more categories of the terrestrial data comprise one of aircraft control data, in-flight entertainment data, and airplane information system data, and wherein each the one or more categories corresponding to different ones of the authentication results;
establishing the BPL communication channel using a BPL module, an electrical power cable connected to the aircraft and to the ground-based system, and at least a portion of an onboard electrical power distribution system of the aircraft, when the biometric data is positively authenticated, wherein the portion of the onboard electrical power distribution system is electrically coupled to the ground-based system by the electrical power cable; and
transmitting the one or more categories of the terrestrial data, selected based on the authentication results, between the aircraft and the ground-based system using the BPL communication channel.

2. The method of claim 1, further comprising selecting the authentication reference data based on one or more characteristics of the BPL communication channel.

3. The method of claim 2, wherein the one or more characteristics of the BPL communication channel comprise one of a type of the terrestrial data for transmission through the BPL communication channel, a security level of the terrestrial data for transmission through the BPL communication channel, and a type of an aircraft module connected to the BPL communication channel.

4. The method of claim 1, wherein:
the biometric module is a gate biometric module, which is a part of the ground-based system,
the gate biometric module is connected to and controls operations of a cable lock; and
the cable lock controls at least a portion of the electrical power cable and connectivity of the electrical power cable to the aircraft.

5. The method of claim 4, further comprising, prior to establishing the BPL communication channel:
unlocking the electrical power cable from the cable lock; and
connecting the electrical power cable to the aircraft.

6. The method of claim 1, wherein:
the biometric module is an onboard biometric module; and
the BPL module is an onboard BPL module; and
the onboard BPL module is directly, inductively, or capacitively coupled to the onboard electrical power distribution system.

7. The method of claim 1, further comprising, when authentication of the biometric data fails, updating an authentication log and determining availability of a manual authentication override.

8. The method of claim 7, further comprising receiving, at the biometric module, override data and authenticating the override data.

9. The method of claim 1, further comprising, when biometric data is negatively authenticated, determining if an attempt threshold has been reached.

10. The method of claim 1, further comprising, when biometric data is negatively authenticated, performing a system lockdown.

11. The method of claim 1, further comprising, transmitting electrical power to the aircraft from the ground-based system using the electrical power cable.

12. The method of claim 11, further comprising, powering the BPL module and the biometric module using the electrical power transmitted to the aircraft.

13. The method of claim 1, wherein establishing the BPL communication channel depends on electrical power transmitted through the electrical power cable, connected to the aircraft and to the ground-based system.

14. The method of claim 1, further comprising transmitting the authentication results together with the terrestrial data.

15. The method of claim 1, further comprising receiving the authentication reference data at a database communicatively coupled to the biometric module.

16. The method of claim 1, further comprising transmitting the authentication results to an operator of the aircraft.

17. The method of claim 1, further comprising receiving the authentication reference data from an operator of the aircraft.

18. A restricted access communication system for transmission of terrestrial data between an aircraft and a ground-based system, the restricted access communication system comprising:
a biometric module, configured to receive biometric data from a user and also configured to authenticate the biometric data based on authentication reference data, associated with a BPL communication channel between the aircraft and the ground-based system, and to produce authentication results; and
a BPL module, communicatively coupled to the biometric module and configured to receive the authentication results from the biometric module, to selecting one or more categories of the terrestrial data based on the authentication results, to form the BPL communication channel based on the authentication results received from the biometric module, and transmit the one or more categories of the terrestrial data, selected based on the authentication results, between the aircraft and the ground-based system using the BPL communication channel, wherein the one or more categories of the terrestrial data comprise one of aircraft control data, in-flight entertainment data, and airplane information system data, and wherein each the one or more categories corresponding to different ones of the authentication results.

19. The restricted access communication system of claim 18, further comprising a database, comprising the authentication reference data, wherein the database is a part of or is communicatively coupled to the biometric module.

20. The restricted access communication system of claim 19, wherein the database further comprises an authentication log for storing the authentication results.

21. The restricted access communication system of claim 20, further comprising a communication module, configured to transmit the authentication results to an operator of the aircraft.

22. The restricted access communication system of claim 18, further comprising a communication module, configured to receive the authentication reference data from an operator of the aircraft.

23. The restricted access communication system of claim 18, wherein the biometric module is configured to select the authentication reference data based on one or more characteristics of the BPL communication channel.

24. The restricted access communication system of claim 18, further comprising a cable lock, wherein:
   the biometric module is a gate biometric module, which is a part of the ground-based system;
   the gate biometric module is connected to and controls operations of the cable lock; and
   the cable lock controls at least a portion of an electrical power cable and connectivity of the electrical power cable to the aircraft.

25. The restricted access communication system of claim 18, wherein:
   the biometric module is an onboard biometric module; and
   the BPL module is an onboard BPL module; and
   the onboard BPL module is directly, inductively, or capacitively coupled to an onboard electrical power distribution system of the aircraft.

* * * * *